(12) United States Patent
Tsukada

(10) Patent No.: US 12,040,726 B2
(45) Date of Patent: Jul. 16, 2024

(54) CONVERTER, CONTROL DEVICE FOR CONVERTER, AND CONTROL METHOD FOR CONVERTER

(71) Applicant: HONDA MOTOR CO., LTD., Tokyo (JP)

(72) Inventor: Yoshinari Tsukada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 17/824,957

(22) Filed: May 26, 2022

(65) Prior Publication Data
US 2022/0393617 A1   Dec. 8, 2022

(30) Foreign Application Priority Data

Jun. 8, 2021   (JP) .................................. 2021-096058

(51) Int. Cl.
| | | |
|---|---|---|
| *H02M 7/797* | (2006.01) | |
| *B60L 7/10* | (2006.01) | |
| *B60L 53/20* | (2019.01) | |
| *H02M 3/00* | (2006.01) | |
| *H02M 3/335* | (2006.01) | |
| *H02P 27/06* | (2006.01) | |

(52) U.S. Cl.
CPC ............. *H02M 7/797* (2013.01); *H02M 3/01* (2021.05); *H02M 3/33573* (2021.05); *H02M 3/33584* (2013.01); *B60L 7/10* (2013.01); *B60L 53/20* (2019.02); *H02P 27/06* (2013.01)

(58) Field of Classification Search
CPC .... H02M 7/797; H02M 3/01; H02M 3/33573; H02M 3/33584; H02M 3/33507; H02M 1/08; B60L 7/10; B60L 53/20; B60L 2210/10; B60L 2210/30; B60L 2210/40; B60L 15/007; B60L 55/00; H02P 27/06; H02P 3/18; H02P 2201/09
USPC .......... 318/139, 400.29, 400.26, 400.01, 700
See application file for complete search history.

(56) References Cited

U.S. PATENT DOCUMENTS

| | | | | |
|---|---|---|---|---|
| 7,649,335 | B2 * | 1/2010 | Ishikawa ............... | B60L 3/0069 |
| | | | | 320/104 |
| 9,490,710 | B2 * | 11/2016 | Yamada .................. | B60L 53/22 |
| 9,887,616 | B2 * | 2/2018 | Bai ....................... | H02M 7/219 |
| 10,505,487 | B2 * | 12/2019 | Mao ....................... | H02K 17/14 |

(Continued)

FOREIGN PATENT DOCUMENTS

| | | |
|---|---|---|
| JP | 01-202169 | 8/1989 |
| JP | 2019-176536 | 10/2019 |
| WO | 2013/186991 | 12/2013 |

OTHER PUBLICATIONS

Japanese Office Action for Japanese Patent Application No. 2021-096058 mailed Jan. 17, 2023.

*Primary Examiner* — David Luo
(74) *Attorney, Agent, or Firm* — Amin, Turocy & Watson, LLP

(57) ABSTRACT

Provided is a converter including: a primary-side switching unit to be connected to a battery; a secondary-side switching unit to be connected to a motor; a transformer provided between the primary-side switching unit and the secondary-side switching unit; and a controller configured to control at least the secondary-side switching unit so as to output a voltage that depends on an output waveform profile of a desired waveform to the motor.

6 Claims, 11 Drawing Sheets

(56) References Cited

U.S. PATENT DOCUMENTS

| | | | |
|---|---|---|---|
| 2012/0092894 A1* | 4/2012 | Navarro | H02P 13/06 363/13 |
| 2015/0124490 A1 | 5/2015 | Sanuki et al. | |

* cited by examiner

FIG. 1
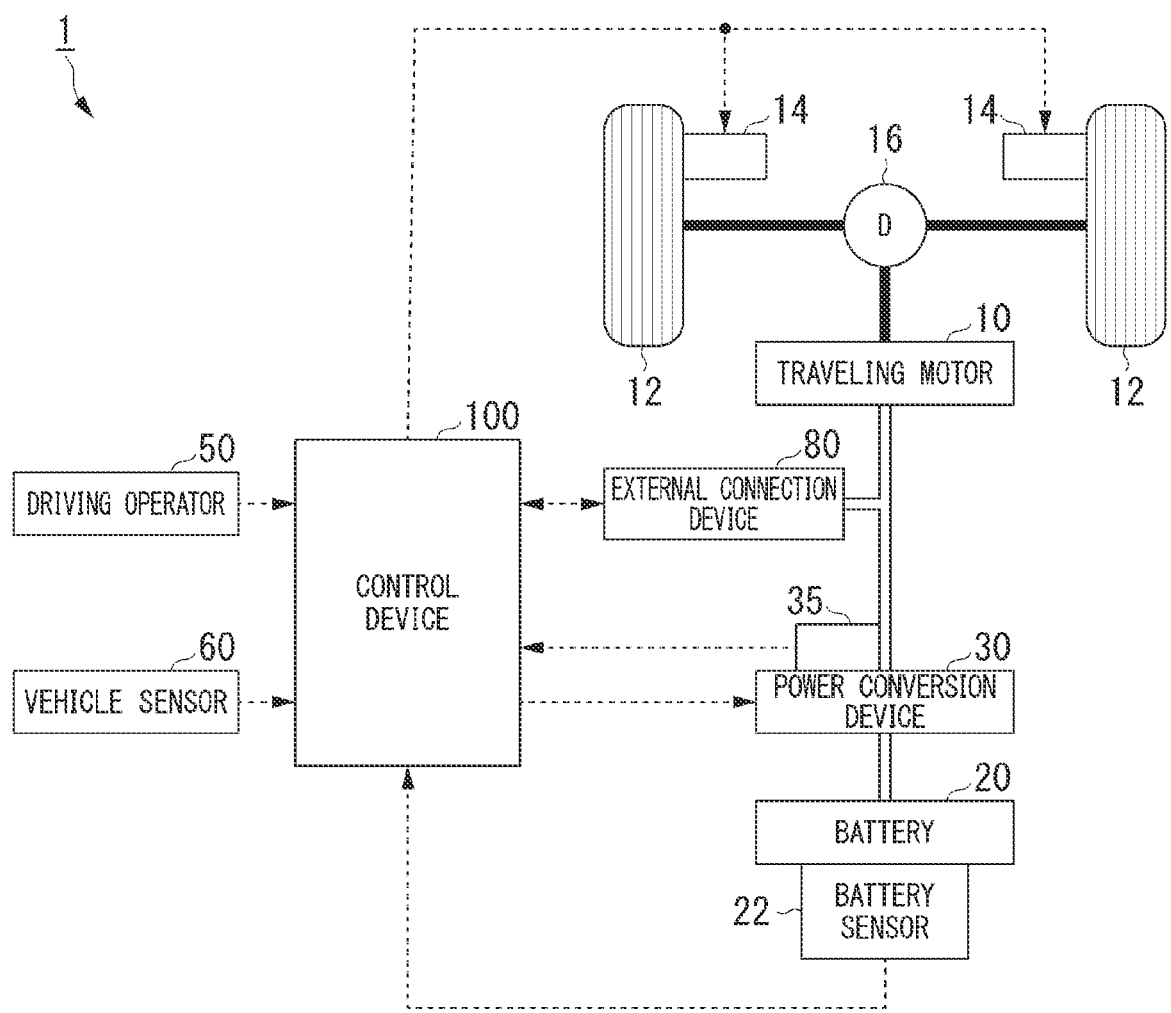
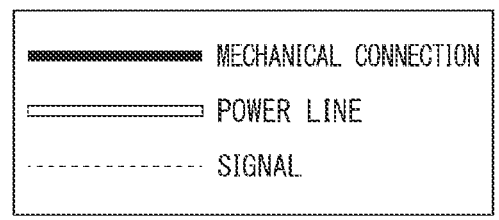

CONVERTER, CONTROL DEVICE FOR CONVERTER, AND CONTROL METHOD FOR CONVERTER

CROSS-REFERENCE TO RELATED APPLICATION

The application is based on Japanese Patent Application No. 2021-096058 filed on Jun. 8, 2021, the content of which incorporated herein by reference.

BACKGROUND

Field of the Invention

The present invention relates to a converter, a control device for the converter, and a control method for the converter.

Description of Related Art

In an LLC Resonant converter, the voltage gain or resonant frequency changes depending on the situation of a load. Further, the LLC resonant converter has a narrow control range of the output voltage, and is usually used for a purpose that does not require broad control of the output voltage. To address such a problem, for example, WO 2013-186991 proposes the technology of switching a control method such as PFM (Pulse Frequency Modulation) or PPM (Pulse Phase shift Modulation) by using a pulse generator.

SUMMARY

However, the technology described in WO 2013-186991 is required to prepare a plurality of circuits that correspond to different control methods to increase the control range of the output voltage, resulting in complexity of the circuit in some cases.

The present invention has been made in view of the above, and has an object to provide a converter, a control device for the converter, and a control method for the converter, which are capable of increasing the control range of the output voltage while avoiding complexity of the circuit.

a control device for the converter, and a control method for the converter according to the present invention adopt the following configuration.

(1): According to an aspect of the present invention, there is provided a converter including: a primary-side switching unit to be connected to a battery; a secondary-side switching unit to be connected to a motor; a transformer provided between the primary-side switching unit and the secondary-side switching unit; and a controller configured to control at least the secondary-side switching unit so as to output a voltage that depends on an output waveform profile of a desired waveform to the motor.

(2): In the aspect (1), the converter further includes a switching mechanism configured to switch a turn ratio of the transformer.

(3): In the aspect (2), when the motor executes a regenerative operation, the controller controls the switching mechanism to switch the turn ratio of the transformer.

(4): In the aspect (3), when the motor executes a regenerative operation, the controller controls the switching mechanism to increase a step-up ratio from the secondary-side switching unit to the primary-side switching unit.

(5): In the aspect (1), the converter is an LLC resonant converter, and the controller causes the secondary-side switching unit to generate the voltage that depends on the output waveform profile by pulse number modulation control.

(6): According to another aspect of the present invention, there is provided a control device for a converter, the converter including: a primary-side switching unit to be connected to a battery; a secondary-side switching unit to be connected to a motor; a transformer provided between the primary-side switching unit and the secondary-side switching unit; and a switching mechanism configured to switch a turn ratio of the transformer, wherein the control device is configured to control at least the secondary-side switching unit so as to output a voltage that depends on an output waveform profile of a desired waveform to the motor.

(7): According to another aspect of the present invention, there is provided a control method for a converter, the converter including: a primary-side switching unit to be connected to a battery; a secondary-side switching unit to be connected to a motor; a transformer provided between the primary-side switching unit and the secondary-side switching unit; and a switching mechanism configured to switch a turn ratio of the transformer, wherein the control method comprises controlling at least the secondary-side switching unit so as to output a voltage that depends on an output waveform profile of a desired waveform to the motor.

According to the aspects (1) to (7), it is possible to increase the control range of the output voltage while avoiding complexity of the circuit.

BRIEF DESCRIPTION OF THE DRAWINGS

FIG. 1 is a diagram illustrating an example of a configuration of a vehicle in which a power conversion device including a converter according to an embodiment is employed.

DESCRIPTION OF EMBODIMENTS

Figure 2:
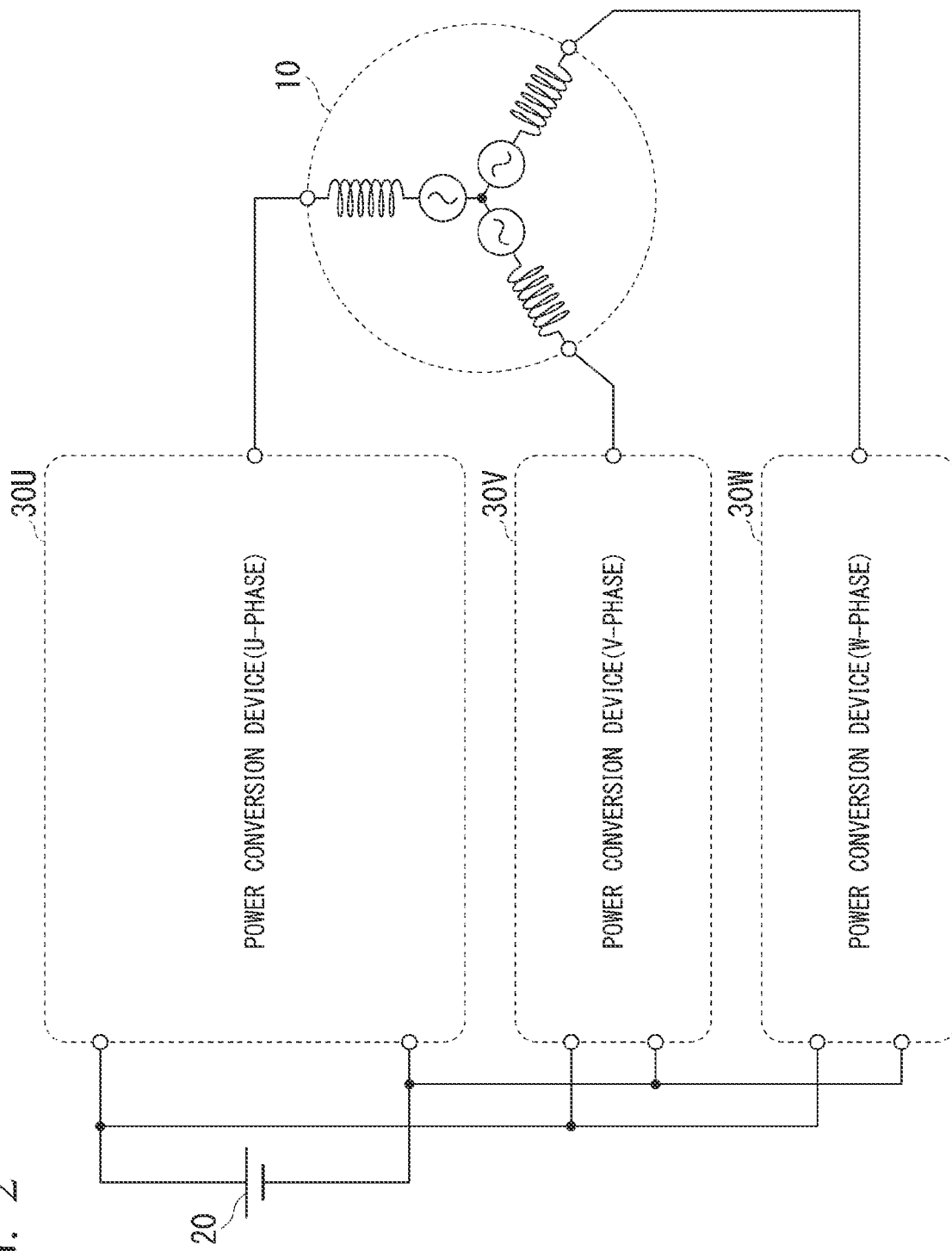
FIG. 2 is a diagram illustrating an example of an overall configuration of the power conversion device included in the vehicle.

Now, an embodiment of a converter, a control device for the converter, and a control method for the converter is described with reference to the drawings.

[Configuration of Vehicle]

FIG. 1 is a diagram illustrating an example of a configuration of a vehicle in which a power conversion device according to an embodiment is employed. A vehicle 1 is an electric vehicle (EV) (hereinafter simply referred to as "vehicle") traveling using an electric motor driven by power supplied from a battery (rechargeable battery) for traveling. The vehicle to which the present invention is applied is not limited to a four-wheeled vehicle, but may be a saddle-riding two-wheeled vehicle, a three-wheeled vehicle (including a vehicle with two front wheels and one rear wheel in addition to one front wheel and two rear wheels), or an assisted bicycle. The vehicle to which the present invention is applied may generally be a vehicle that travels using an electric motor driven by power supplied from a battery for traveling. The vehicle 1 may be, for example, a hybrid electric vehicle (HEV) that travels through a further combination of power supplied by the operation of an internal combustion engine that uses fuel as its energy source, such as a diesel engine or a gasoline engine.

The vehicle 1 includes, for example, a traveling motor 10, a drive wheel 12, a braking device 14, a speed reducer 16, a battery 20, a battery sensor 22, a power conversion device 30, a power sensor 35, a driving operator 50, a vehicle sensor 60, an external connection device 80, and a control device 100.

The traveling motor 10 is a rotating electric motor for driving the vehicle 1. The traveling motor 10 is, for example, a three-phase AC electric motor. The rotor of the traveling motor 10 is connected to the speed reducer 16. The traveling motor 10 is driven (rotated) by power supplied from the battery 20 through the power conversion device 30. The traveling motor 10 transfers its own rotational power to the speed reducer 16. The traveling motor 10 may operate as a regenerative brake using kinetic energy from the deceleration of vehicle 1 to generate electricity.

The braking device 14 placed on the drive wheel 12 has, for example, a brake caliper, a cylinder that transmits hydraulic pressure to the brake caliper, and an electric motor that generates hydraulic pressure to the cylinder. The braking device 14 may be equipped with, as a backup, a mechanism that transmits the hydraulic pressure generated by the operation of the brake pedal (not shown) by the user (driver) of the vehicle 1 to the cylinder via the master cylinder. The braking device 14 is not limited to the configuration described above, and may also be an electronically controlled hydraulic braking device that transmits hydraulic pressure from the master cylinder to the cylinder.

The speed reducer 16 is, for example, a differential gear. The speed reducer 16 causes the driving force of a shaft to which the traveling motor 10 is connected, namely, the rotational force of the traveling motor 10 to a shaft to which the drive wheel 12 is connected. The speed reducer 16 may include, for example, a transmission mechanism in which a plurality of gears and shafts are combined to change the rotational speed of the traveling motor 10 and transmit the rotational speed to the shaft according to a transmission ratio (gear ratio). The speed reducer 16 may include, for example, a clutch mechanism that directly couples or decouples the rotational force of the traveling motor 10 to/from the shaft.

The battery 20 is a battery including, as the storage unit, a rechargeable battery that can be repeatedly charged and discharged, such as a lithium-ion battery. The battery 20 may be easily removable from the vehicle 1, for example, a cassette-type battery pack, or may have fixed structure that is not easily removable from the vehicle 1. The rechargeable battery included in the battery 20 is, for example, a lithium-ion battery. The rechargeable battery included in the battery 20 may be, for example, a lead-acid battery, a nickel-metal hydride battery, a sodium ion battery, or a capacitor such as an electric double layer capacitor, or a composite battery combining a rechargeable battery and a capacitor, but any configuration of a rechargeable battery is possible. The battery 20 stores (charges) power introduced from a charger (not shown) external to the vehicle 1 and discharges the stored power to drive the vehicle 1. The battery 20 stores (charges) the power generated by the traveling motor 10 operating as a regenerative brake, which is supplied via the power conversion device 30, and discharges the stored power for traveling (e.g., acceleration) of the vehicle 1.

The battery sensor 22 is connected to the battery 20. The battery sensor 22 detects physical quantities such as voltage, current, and temperature of the battery 20. The battery sensor 22 includes, for example, a voltage sensor, a current sensor, and a temperature sensor. The battery sensor 22 detects the voltage of the battery 20 by the voltage sensor, detects the current of the battery 20 by the current sensor, and detects the temperature of the battery 20 by the temperature sensor. The battery sensor 22 outputs the detected voltage value, current value, temperature, and other information (hereinafter referred to as "battery information") of the battery 20 to the control device 100.

The power conversion device 30 boosts or steps down the direct current power (DC power) supplied (discharged) from the battery 20 to the voltage used to supply power to the traveling motor 10, and further converts the voltage to alternating current power (AC power) for driving the traveling motor 10 for output to the traveling motor 10. The power conversion device 30 converts the AC power generated by the traveling motor 10, which operated as a regenerative brake, into DC power, and then boosts or steps down the voltage to the voltage at which the battery 20 is charged for output to the battery 20 for storage. In other words, the power conversion device 30 realizes functions similar to those of a DC-DC converter combined with an AC-DC converter or similar to those of an inverter. The power conversion device 30 can also convert DC power supplied (discharged) from the battery 20 into AC power to be output to the external connection device 80, for example, for operating household appliances in an emergency or for supplying power to the power grid for sale. In this case, the power conversion device 30 can boost or step down the voltage according to the output destination of power before outputting the voltage.

[Configuration of Power Conversion Device included in Vehicle]

FIG. 2 is a diagram illustrating an example of an overall configuration of the power conversion device 30 included in the vehicle 1. In FIG. 2, the battery 20 and the traveling motor 10 related to the power conversion device 30 are also shown. When the traveling motor 10 is a single-phase AC motor, the AC power output from one power conversion device 30 can drive the traveling motor 10. However, as described above, when the traveling motor 10 is a three-phase AC motor, the AC power is required to be output in each phase (U-phase, V-phase, W-phase). Thus, as illustrated in FIG. 2, in the vehicle 1, three power conversion devices 30 (power conversion device 30U, power conversion device 30V, and power conversion device 30W) each drive the traveling motor 10 by AC power. The power conversion device 30U, the power conversion device 30V, and the power conversion device 30W may have the same configuration, or may partially share the common configuration. Each of the power conversion device 30U, the power conversion device 30V, and the power conversion device 30W outputs AC power of the same voltage waveform. Thus, in the vehicle 1, for example, by differential synthesis of the AC power output by the respective power conversion devices 30, the AC power is converted to AC power having the same voltage waveform and different phases (120° out of phase), and then output to the traveling motor 10.

Referring back to FIG. 1, the power sensor 35 is mounted to the power line on the side of the traveling motor 10 in the power conversion device 30. The power sensor 35 includes, for example, a measuring instrument such as a power meter, a voltmeter, and an ammeter, and power output by the power conversion device 30 to the traveling motor 10 (hereinafter referred to as "output power") is measured on the basis of the measurement values of those measuring instruments. The power sensor 35 outputs information on the measured output power of the power conversion device 30 (hereinafter referred to as "output power information") to the control device 100.

The driving operator 50 includes, for example, an accelerator pedal, a brake pedal, a shift lever, a steering wheel, a deformed steering wheel, a joystick, and other operators. A sensor for detecting whether or not the user (driver) of the vehicle 1 has operated each operator, or a sensor for detecting an operation amount thereof is mounted to the driving operator 50. The driving operator 50 outputs the result of detection by the sensor to the control device 100. For example, an accelerator opening sensor is mounted to the accelerator pedal, and the accelerator opening sensor detects an operation amount of the accelerator pedal by the driver and outputs the detected operation amount to the control device 100 as the accelerator opening. For example, a brake depression sensor is mounted to the brake pedal, and the brake depression sensor detects an operation amount of the brake pedal by the driver and outputs the detected operation amount to the control device 100 as the brake depression amount. The accelerator opening is information for the driver to instruct (request) the control device 100 to supply power to the traveling motor 10 from the battery 20 in traveling of the vehicle 1. In other words, the accelerator opening is information representing the amount of power to be supplied to the traveling motor 10, which is requested by the driver.

The vehicle sensor 60 detects the traveling state of the vehicle 1. The vehicle sensor 60 includes, for example, a vehicle speed sensor that detects the speed of the vehicle 1 and an accelerator sensor that detects the acceleration of the vehicle 1. The vehicle speed sensor detects the speed of the vehicle 1, and outputs information on the detected vehicle speed of the vehicle 1 to the control device 100. The vehicle speed sensor may include, for example, a wheel speed sensor and a speed calculator mounted to each drive wheel 12 of the vehicle 1, and integrate the wheel speeds detected by the wheel speed sensors to derive (detect) the speed of the vehicle 1. The acceleration sensor detects the acceleration of the vehicle 1, and outputs information on the detected acceleration of the vehicle 1 to the control device 100. The vehicle sensor 60 may include, for example, a yaw rate sensor that detects the angular speed of the vehicle 1 around a vertical axis or a direction sensor that detects the direction of the vehicle 1. In this case, each sensor outputs the detection result to the control device 100.

The external connection device 80 is, for example, a power supply connector such as a USB (Universal Serial Bus) terminal or an accessory socket (so-called cigar sockets), a commercial power outlet for operating household appliances and personal computers, or a connector for connecting to the power grid at the time of selling electricity.

The control device 100 controls activation or operation of the power conversion device 30 depending on a detection result, which is output by each sensor included in the driving operator 50, that is, an operation of each operator by the user (driver) of the vehicle 1. For example, the control device 100 controls activation or operation of the power conversion device 30 depending on the accelerator opening detected by the accelerator opening sensor. At this time, the control device 100 controls activation or operation of the power conversion device 30 in consideration of the transmission ratio (gear ratio) of the controlled transmission mechanism or the vehicle speed included in the traveling state information output by the vehicle sensor 60, for example. In other words, the control device 100 controls the driving force of the traveling motor 10.

The control device 100 further controls the amount of supply of AC power, which is to be supplied to the traveling motor 10 from the battery 20, and the frequency of supplied AC power (that is, voltage waveform) when the vehicle 1 is traveling. Thus, the control device 100 outputs information for changing the amount of supply of AC power and the voltage waveform to the power conversion device 30. More specifically, the control device 100 outputs, to the power conversion device 30, information such as the voltage value of AC power, the timing of causing the battery 20 to output DC power, the output waveform profile for generating AC voltage waveform, and the timing of switching the output waveform profile.

[Configuration of Power Conversion Device]

Figure 3:
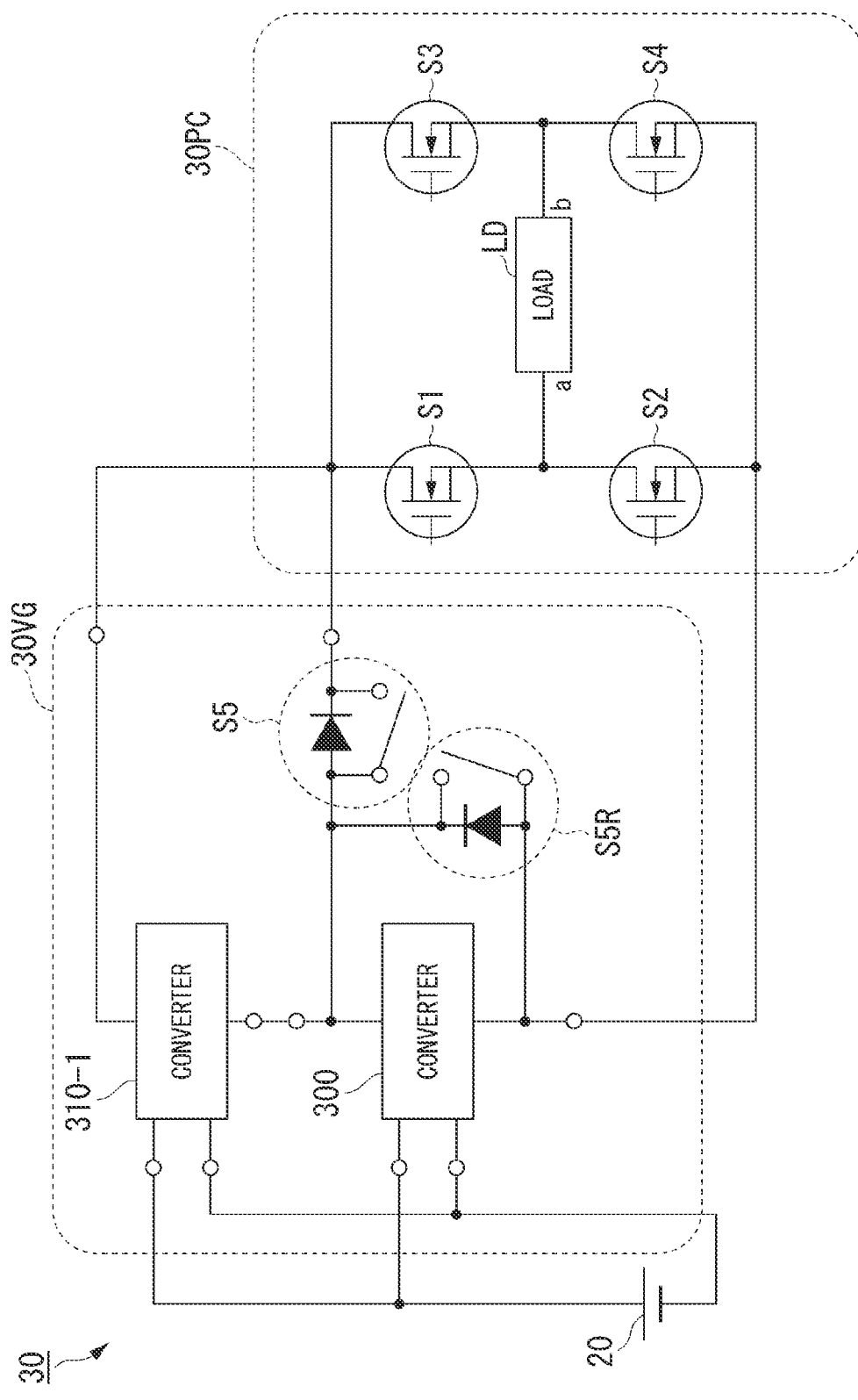
FIG. 3 is a diagram illustrating an example of the configuration of the power conversion device.

FIG. 3 is a diagram illustrating an example of the configuration of the power conversion device 30 according to a first embodiment. In FIG. 3, the battery 20 and a load LD related to the power conversion device 30 are shown. The power conversion device 30 illustrated in FIG. 3 is the power conversion device 30 corresponding to any one of the U phase, V phase, and W phase of three phases in the traveling motor 10 included in the vehicle 1. Thus, the load LD is an inductive load of any one of phases in the traveling motor 10 included in the vehicle 1. The power conversion device 30 includes, for example, a voltage waveform generation unit 30VG and a single-phase converter 30PC.

The voltage waveform generation unit 30VG generates a voltage waveform, which is a half-wave of a sine wave, on the basis of DC power supplied (discharged) from the battery 20. The single-phase converter 30PC inverts even-numbered half waves of the voltage waveform generated by the voltage waveform generation unit 30VG to obtain the converted volage waveform serving as a sine wave when supplying the power to the load LD. The voltage waveform generation unit 30VG includes, for example, a converter 300, a converter 310-1, a switching element S5, and a switching element S5R. The single-phase converter 30PC includes, for example, four switching elements (switching elements S1 to S4).

The converter 300, the switching element S5, and the switching element S5R output the output power of the voltage waveform, which is based on the input or set output waveform profile, on the basis of DC power supplied (discharged) from the battery 20. The output waveform profile may be successively input or set by the control device 100, for example, or may be successively switched by a controller included in the converter 300. The configuration of the converter 300 is described later.

Each of the switching elements S1 to S4 is a semiconductor switching element. The switching circuit for supplying power to the load LD is constructed by the switching elements S1 to S4. FIG. 3 is an example of a case in which each of the switching elements S1 to S4 is a field effect transistor (FET). Each of the switching elements S1 to S4 switches the direction (direction of current flowing through load LD) of power supplied to the load LD depending on control between a conductive state and a non-conductive state of the control device 100, for example. The control device 100 controls the switching element S1 connected to one terminal a of the load LD and the switching element S4 connected to the other terminal b of the load LD as one combination, and controls the switching element S2 connected to one terminal a of the load LD and the switching element S3 connected to the other terminal b of the load LD as one combination. As a result, when the control device 100 sets the switching element S1 and the switching element S4 to the conductive state and the switching element S2 and the switching element S3 to the non-conductive state, current flows through the load LD from the terminal a to the terminal b. In contrast, when the control device 100 sets the switching element S2 and the switching element S3 to the conductive state and the switching element S1 and the switching element S4 to the non-conductive state, current flows through the load LD from the terminal b to the terminal a. As a result, when the output power is not output from the converter 300, the voltage waveform of power supplied to the load LD is a square wave. At this time, for example, the control device 100 may cause the timing of controlling each of the switching elements S1 to S4 to the conductive state or the non-conductive state to deviate from the timing of controlling each of the switching elements S1 to S4 included in the power conversion device 30 corresponding to another phase of the three phases, to thereby obtain different phases of power of the square wave supplied to the load LD (shift phases by 120°).

The switching element S5 restricts the direction of supply of output power output from the converter 300. FIG. 3 illustrates an example of the case in which the switching element S5 is constructed by a diode and a switch. The switching element S5 controls the direction of supply of output power output from the converter 300 depending on control by the control device 100, for example. When the traveling motor 10 is driven to cause the vehicle 1 to travel, the control device 100 controls the switch included in the switching element S5 to the non-conductive state. As a result, the switching element S5 allows supply of output power, which is output from the converter 300, to the load LD (that is, traveling motor 10), and prevents supply of output power output from the converter 300 to the positive electrode side of the battery 20. On the other hand, when the control device 100 charges the battery 20 by power generated by operating the traveling motor 10 as a regenerative brake, the control device 100 controls the switch included in the switching element S5 to the conductive state. As a result, the switching element S5 allows supply of output power, which is output from the load LD, to the positive electrode side of the battery 20.

Figure 4:
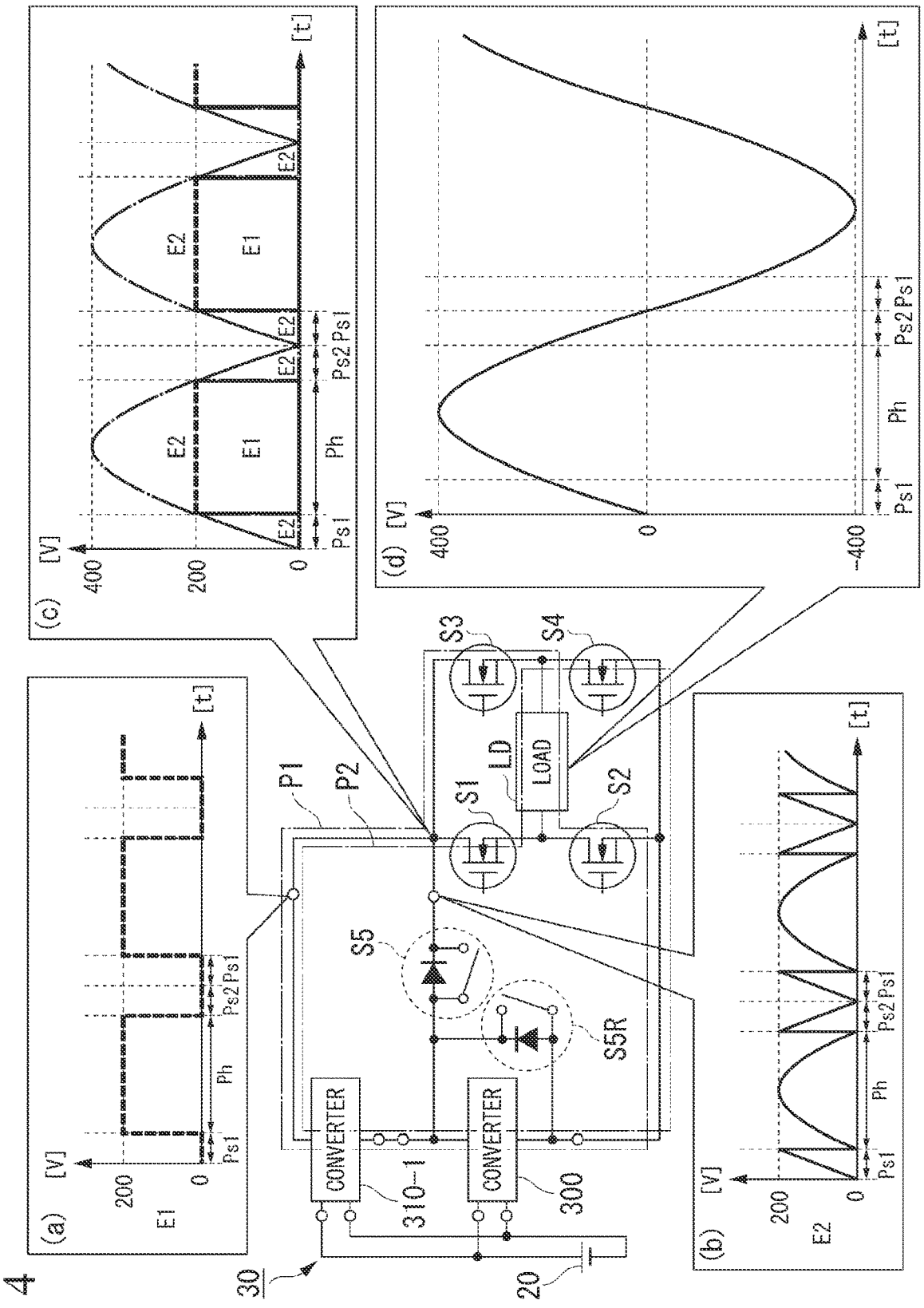
FIG. 4 is a diagram for describing an example of a voltage waveform generated in the power conversion device.

The switching element S5R switches connection between the converter 300 and the converter 310-1. FIG. 4 illustrates an example of the case in which the switching element S5R is constructed by a diode and a switch. When the control device 100 controls the switch included in the switching element S5R to the non-conductive state, the switching element S5R connects the converter 300 and the converter 310-1 (series connection). On the other hand, when the control device 100 controls the switch included in the switching element S5R to the conductive state, the switching element S5R disconnects the converter 300 and the converter 310-1.

The converter 310-1 generates the voltage waveform of a square wave on the basis of DC power supplied (discharged) from the battery 20.

[Voltage Waveform Generated by Power Conversion Device]

FIG. 4 is a diagram for describing an example of a voltage waveform generated in the power conversion device 30. FIG. 4 illustrates an example of the power conversion device 30 in a case in which the switching element S5 is constructed by a field effect transistor FET. FIG. 4 illustrates an example of the voltage waveform at each component in the configuration diagram of the power conversion device 30, which illustrates the related battery 20 and load LD.

In the power conversion device 30, the converter 310-1 generates power E1 in which the voltage waveform as illustrated in FIG. 4(a) is a square wave in accordance with control of the switching circuits (switching element S1 to switching element S4) by the control device 100. That is, the switching circuit in the power conversion device 30 generates and outputs the power E1 having a square waveform of the frequency for driving the traveling motor 10, which is the load LD, in accordance with control by the control device 100. More specifically, the voltage value (200 [V] in FIG. 4(a)) of DC power discharged by the battery 20 in an on-holding period Ph is held, and the switching circuit in the power conversion device 30 generates the waveform of a square wave that sets the voltage value to 0 [V] in accordance with control in a predetermined period by the control device 100. The power E1 of the waveform of a square wave illustrated in FIG. 4(a) has a voltage waveform generated by the switching circuit when the output power is not output from the converter 310-1, that is, when the control device 100 stops the operation of the power conversion device 30. The voltage waveform of the power E1 illustrated in FIG. 4(a) is an example of the case in which power is supplied to the load LD through a current path P1 when the vehicle 1 is caused to travel. The voltage waveform of the power E1 in a case where power is supplied to the load LD through a current path P2 is equivalent to the inversion of the voltage waveform of the power E1 illustrated in FIG. 4(a).

In the power conversion device 30, when the operation of the converter 300 is started by the control device 100, the converter 300 generates and outputs the output power E2 of the voltage waveform as illustrated in FIG. 4(b) on the basis of the output waveform profile input or set by the control device 100. The output waveform profile input or set by the control device 100 is used to generate a voltage waveform obtained by subtracting the voltage waveform of the power E1 output by the switching circuit from the half wave of a sine wave of the frequency for driving the traveling motor 10. More specifically, the output waveform profile is constructed by five output waveform profiles, namely, first to five output waveform profiles. The first output waveform profile is a profile that increases the voltage value of the output power E2 from the zero state along the half wave of a sine wave in a switching period Ps1 in which the voltage value of the output power E2 is lower than the voltage value (hereinafter referred to as "DC voltage value") of DC power discharged by the battery 20. The second output waveform profile is a profile that sets the voltage value of the output power E2 to zero when the voltage value of the output power E2 and the DC voltage value are equal to each other. The third output waveform profile is a profile that increases the voltage value of the output power E2 from the zero state similarly to the half wave of the sine wave in the on-holding period Ph, and decreases the voltage value of the output power E2 similarly to the half wave of the sine wave when the voltage value of the output power E2 and the DC voltage value are equal to each other. The fourth output waveform profile is a profile that sets the voltage value of the output power E2 and the DC voltage value to be equal to each other when the voltage value of the output power E2 becomes zero. The fifth output waveform profile is a profile that decreases the voltage value of the output power E2 to the zero state along the half wave of a sine wave from a state in which the voltage value of the output power E2 is equal to the DC voltage value in the switching period Ps2. The control device 100 causes the converter 300 to output the output power E2 of the voltage waveform as illustrated in FIG. 4(b) by sequentially inputting or setting these five output waveform profiles in the converter 300 in accordance with the timing of controlling the switching circuit.

In the power conversion device 30, the power E1 and the output power E2 output by the converter 300 are combined on the load LD side of the switching element S5. That is, in the power conversion device 30, the voltage waveform of the power E1 and the voltage waveform of the output power E2 are combined on the load LD side of the switching element S5. As a result, FIG. 4(c) shows a voltage value (400 [V] in FIG. 4(c)), which is twice as large as the DC voltage value discharged by the battery 20, and power in which the voltage waveform is the half wave of a sine wave with the voltage value=0[V] serving as a reference is supplied to the terminal of the load LD. More specifically, the power of the voltage value, which is twice as large as the DC voltage value, is supplied to the terminal b when power is supplied to the load LD through the current path P1 or supplied to the terminal a when power is supplied to the load LD through the current path P2.

Meanwhile, in the power conversion device 30, the control device 100 controls the switching circuit to generate the power E1 of the square waveform as illustrated in FIG. 4(a). Thus, the direction of current flowing through the load LD when power is supplied to the load LD through the current path P1 and the direction of current flowing through the load LD when power is supplied to the load LD through the current path P2 are opposite to each other. As a result, as illustrated in FIG. 4(d), power having a voltage waveform equal to a sine wave (full wave) of the frequency for driving the traveling motor 10 is supplied to the load LD, which causes the traveling motor 10 to be driven (rotated) by supplied power of the sine wave.

[Configuration of Converter]

Figure 5:
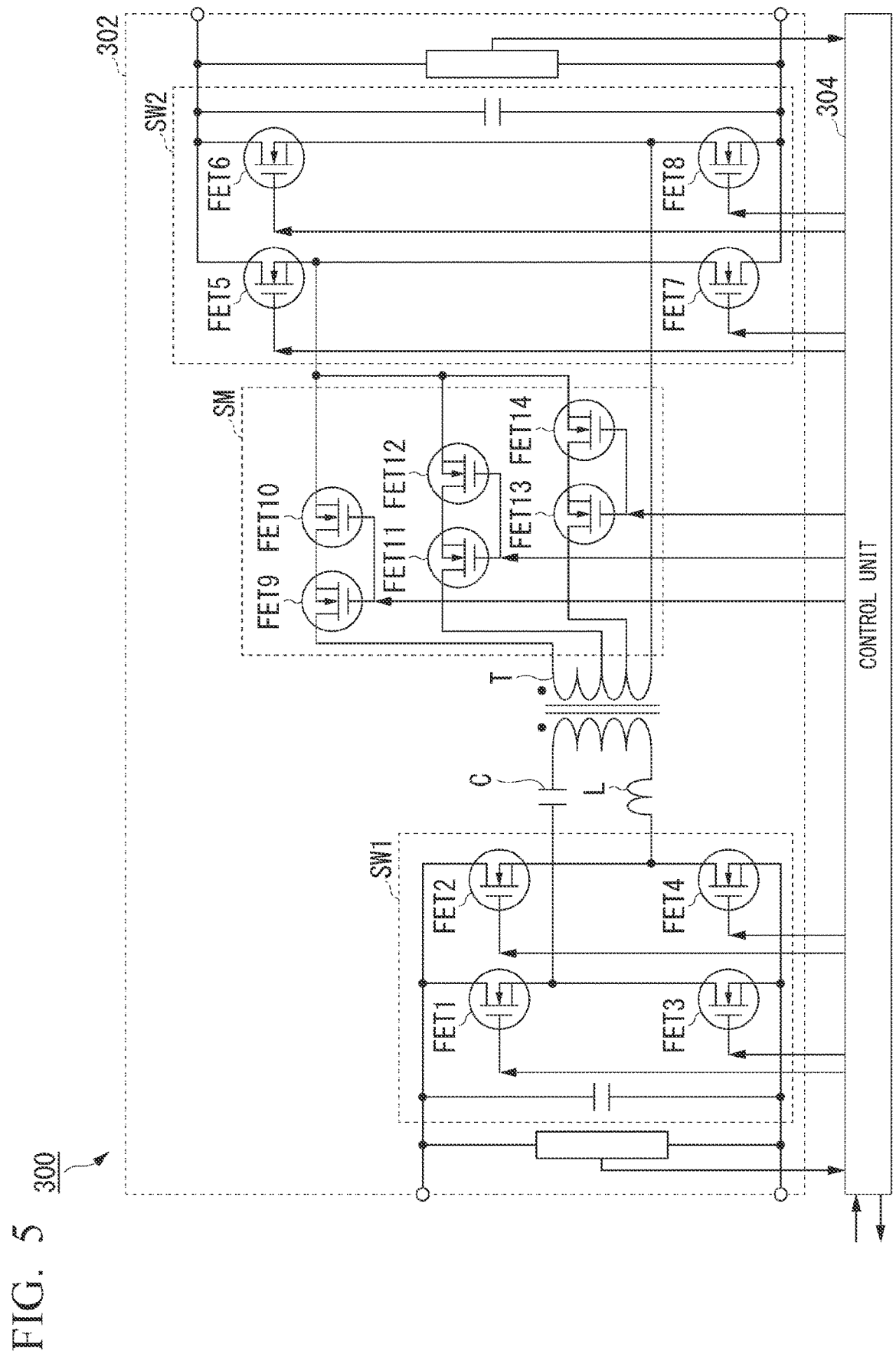
FIG. 5 is a diagram illustrating an example of the configuration of the converter included in the power conversion device.

FIG. 5 is a diagram illustrating an example of the configuration of the converter 300 included in the power conversion device 30. The converter 300 illustrated in FIG. 5 includes, for example, an LLC Resonant converter 302 and a controller 304.

The LLC Resonant converter 302 is an LLC bidirectional isolated converter in which a transformer T is connected between a primary side full bridge circuit and a secondary side full bridge circuit in which field effect transistors FET 1, FET 2, FET 3, and FET 4 and field effect transistors FET 5, FET 6, FET 7, and FET 8 (hereinafter sometimes collectively referred to as "field effect transistor FET") are bridge-connected and in which a capacitor C and an inductor L are connected to the primary side full bridge circuit in series. The secondary side full bridge circuit further includes a switching mechanism SM for switching the turn ratio of the transformer, and in the switching mechanism SM, a combination of the field effect transistors FET 9 and FET 10, a combination of the field effect transistors FET 11 and FET 12, and a combination of the field effect transistors FET 13 and FET 14 are connected to the transformer T in parallel. The combination of the field effect transistor FET 9 and FET 10 are electrically connected to the transformer, but one of the combination of the field effect transistors FET 11 and FET 12 and the combination of the field effect transistors FET 13 and FET 14 can be caused to be electrically connected to the transformer T depending on a gate drive signal output from the controller 304. As a result, as illustrated in FIG. 5, the turn ratio of the transformer is switched depending on the selected combination of field effect transistors. A circuit unit SW1 including the field effect transistors FET 1, FET 2, FET 3, and FET 4 is an example of "primary-side switching unit", and a circuit unit SW2 including the field effect transistors FET 5, FET 6, FET 7, and FET 8 is an example of "secondary-side switching unit".

As described later, the controller 304 controls the field effect transistor FET by PNM (Pulse Number Modulation) control, and thus the voltage of the secondary side full bridge circuit is lower than the voltage of the primary side full bridge circuit, and when the turn ratio of the transformer T remains the same, it is difficult increase the voltage of the secondary side full bridge circuit to the voltage of the primary side full bridge circuit. On the other hand, the voltage output at the time of execution of a regenerative operation by the traveling motor 10 is lower than the voltage of the battery 20, and thus the voltage output from the secondary side full bridge circuit to the primary side full bridge circuit is required to be increased at the time of a regenerative operation. Therefore, when the traveling motor 10 executes a regenerative operation, the controller 304 controls the switching mechanism SM to switch the turn ratio so as to increase the step-up ratio from the secondary side full bridge circuit to the primary side full bridge circuit. More specifically, the controller 304 increases the step-up ratio by switching the path for connecting to the transformer T from the combination of the field effect transistors FET 9 and FET 10 to the combination of the field effect transistors FET 11 and FET 12 or the combination of the field effect transistors FET 13 and FET 14. As a result, it is possible to increase the voltage of the secondary side full bridge circuit to the voltage required for charging the battery 20 at the time of a regenerative operation.

Figure 6:
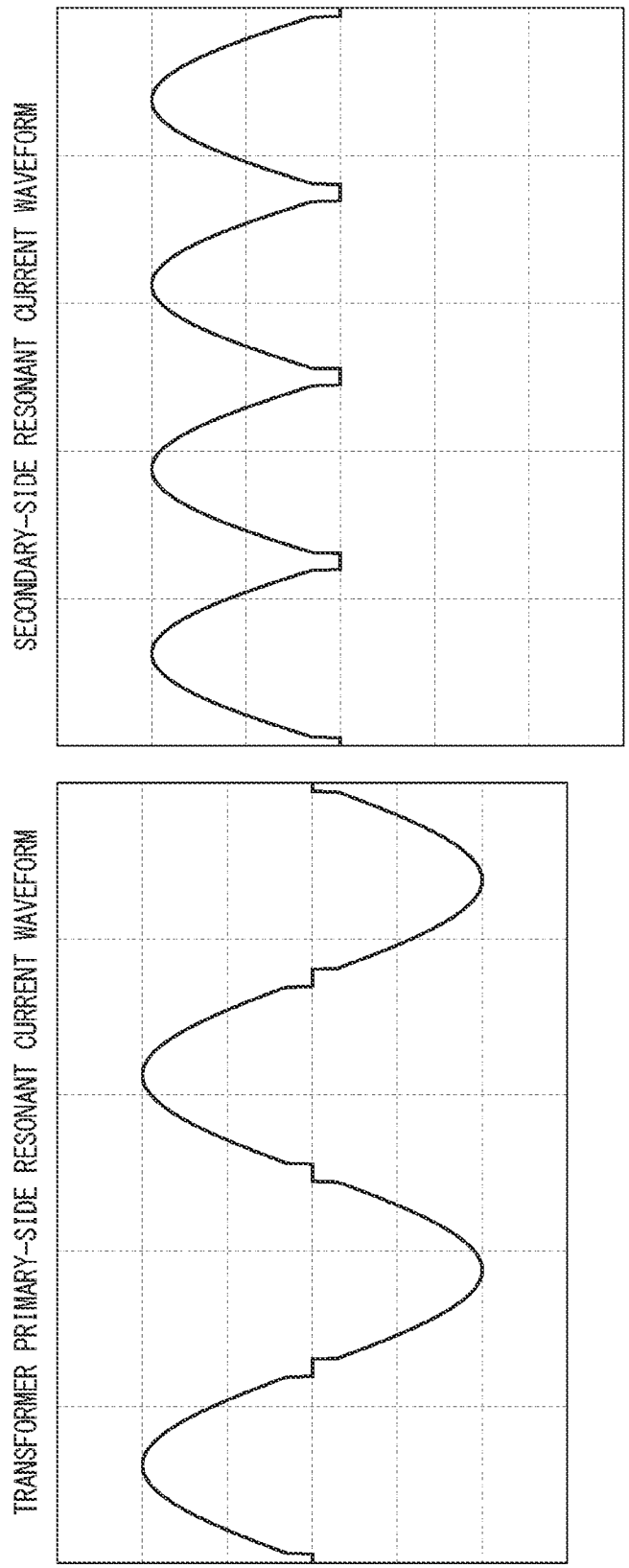
FIG. 6 is a diagram illustrating an example of waveforms output by a primary side full bridge circuit and a secondary side full bridge circuit of the converter.

FIG. 6 is a diagram illustrating an example of waveforms output by the primary side full bridge circuit and the secondary side full bridge circuit of the converter 300. The left part of FIG. 6 shows a resonant current waveform output by the primary side full bridge circuit, and the right part of FIG. 6 shows a resonant current waveform output by the secondary side full bridge circuit. As can be understood from the right part of FIG. 6, a loss occurs when the resonant current output by the secondary side full bridge circuit takes a non-zero value and the field effect transistor FET is switched. Thus, the controller 304 is required to switch the field effect transistor FET when the resonant current output by the secondary side full bridge circuit reaches the zero-cross point, and uses PNW in which control does not depend on the time width. Further, the LLC Resonant converter 302 includes the transformer T, and thus the core of the transformer T saturates with a single control pulse. In order to avoid this situation, the controller 304 switches on/off of the field effect transistor FET in units (minimum resolution) of two control pulses.

The controller 304 controls the on state and off state of each field effect transistor FET included in the LLC Resonant converter 302 in response to control by the control device 100. The controller 304 generates a gate drive signal for driving the gate of each field effect transistor FET. Further, as described above, the controller 304 selects one combination from among the combination of the field effect transistors FET 9 and FET 10, the combination of the field effect transistors FET 11 and FET 12, and the combination of the field effect transistors FET 13 and FET 14, and outputs a gate drive signal for electrically connecting to the transformer T.

[Configuration of Controller]

Figure 7:
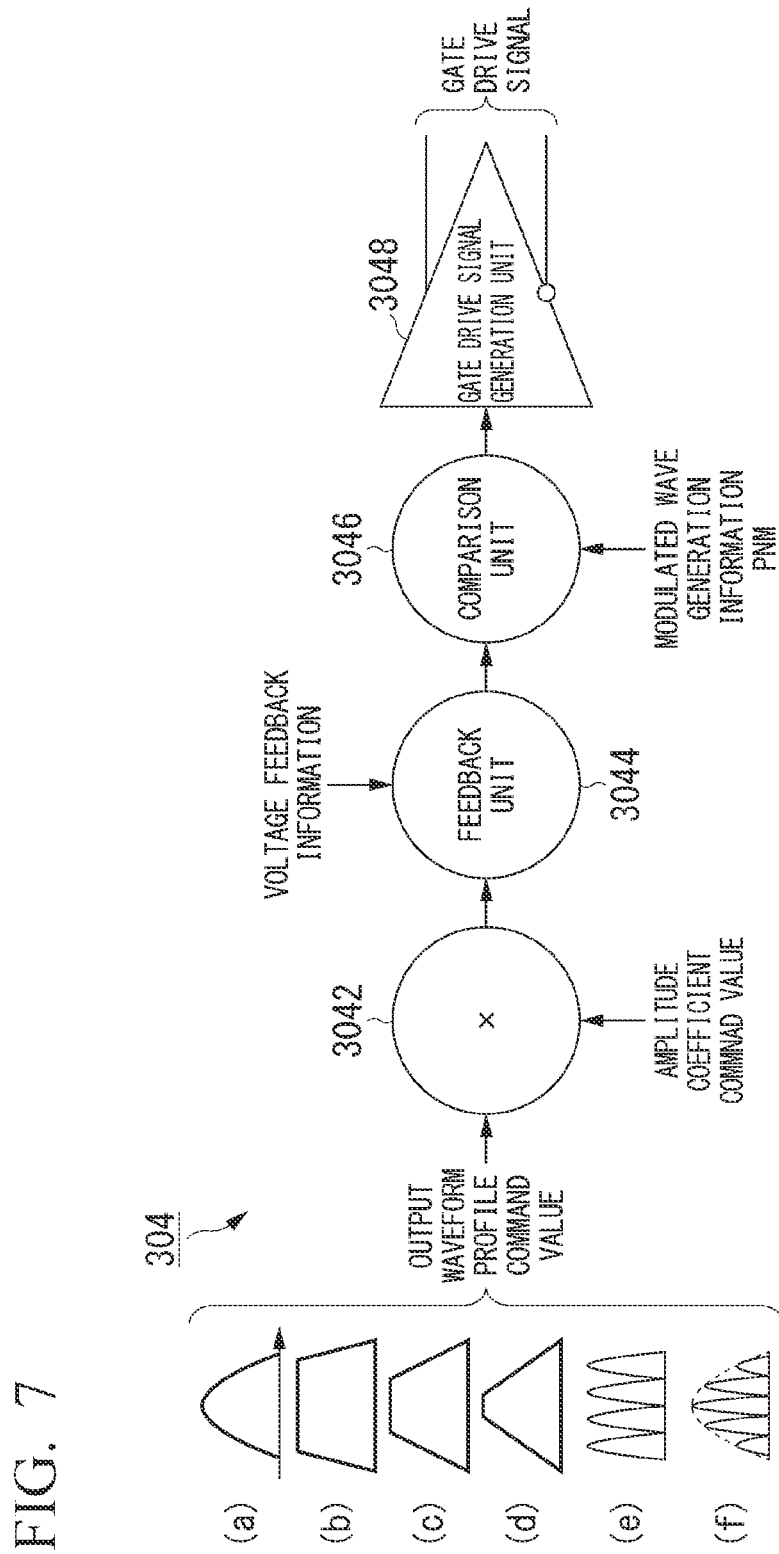
FIG. 7 is a diagram illustrating an example of the functional configuration of a controller included in the converter.

FIG. 7 is a diagram illustrating an example of the functional configuration of the controller 304 included in the converter 300. In the following description, the controller 304 includes, for example, a multiplier 3042, a feedback unit 3044, a comparison unit 3046, and a gate drive signal generation unit 3048.

The multiplier 3042 multiplies a command value for the output waveform profile input or set by the control device 100 by an amplitude coefficient command input by the control device 100 to acquire a voltage value to be output from the LLC Resonant converter 302. FIG. 7(a) to FIG. 7(f) illustrate an example of the output waveform profile. The multiplier 3042 multiplies a command value for the output waveform profile, which achieves a voltage waveform that depends on the output waveform profile as illustrated in FIG. 7(a) to FIG. 7(f), by an amplitude coefficient command value for each sampling timing to acquire a voltage value to be output from the LLC Resonant converter 302. The amplitude coefficient command value is a target value of output power to be output by the converter 300.

The feedback unit 3044 performs feedback control on the basis of voltage feedback information input by the control device 100. The feedback unit 3044 uses feedback control to generate a voltage control pulse for causing the current voltage value output from the LLC Resonant converter 302 to approach the voltage value acquired by the multiplier 3042. The feedback control by the feedback unit 3044 is, for example, PID control that combines proportional (P) control, integral (I) control, and derivative (D) control. The feedback control in the feedback unit 3044 is not limited to PID control, but may be other feedback control methods.

The comparison unit 3046 modulates the voltage control pulse generated by the feedback unit 3044 in a modulation algorithm that depends on modulated wave generation information input by the control device 100. The comparison unit 3046 modulates the voltage control pulse in a modulation algorithm such as PNM, for example. The modulated wave generation information is information specifying the modulation algorithm. The comparison unit 3046 outputs a modulated signal obtained by modulating the voltage control pulse.

The gate drive signal generation unit 3048 generates a gate drive signal to be input to the gate terminal of each field effect transistor FET included in the LLC Resonant converter 302 on the basis of the modulated signal modulated by the comparison unit 3046. As a result, each field effect transistor FET included in the power conversion device 30 is set to an on state or off state depending on the input gate drive signal, and the LLC Resonant converter 302 outputs output power of the voltage waveform (refer to FIG. 4(b)) corresponding to the frequency for driving the traveling motor 10, which depends on the output waveform profile input or set by the control device 100.

Figure 8:
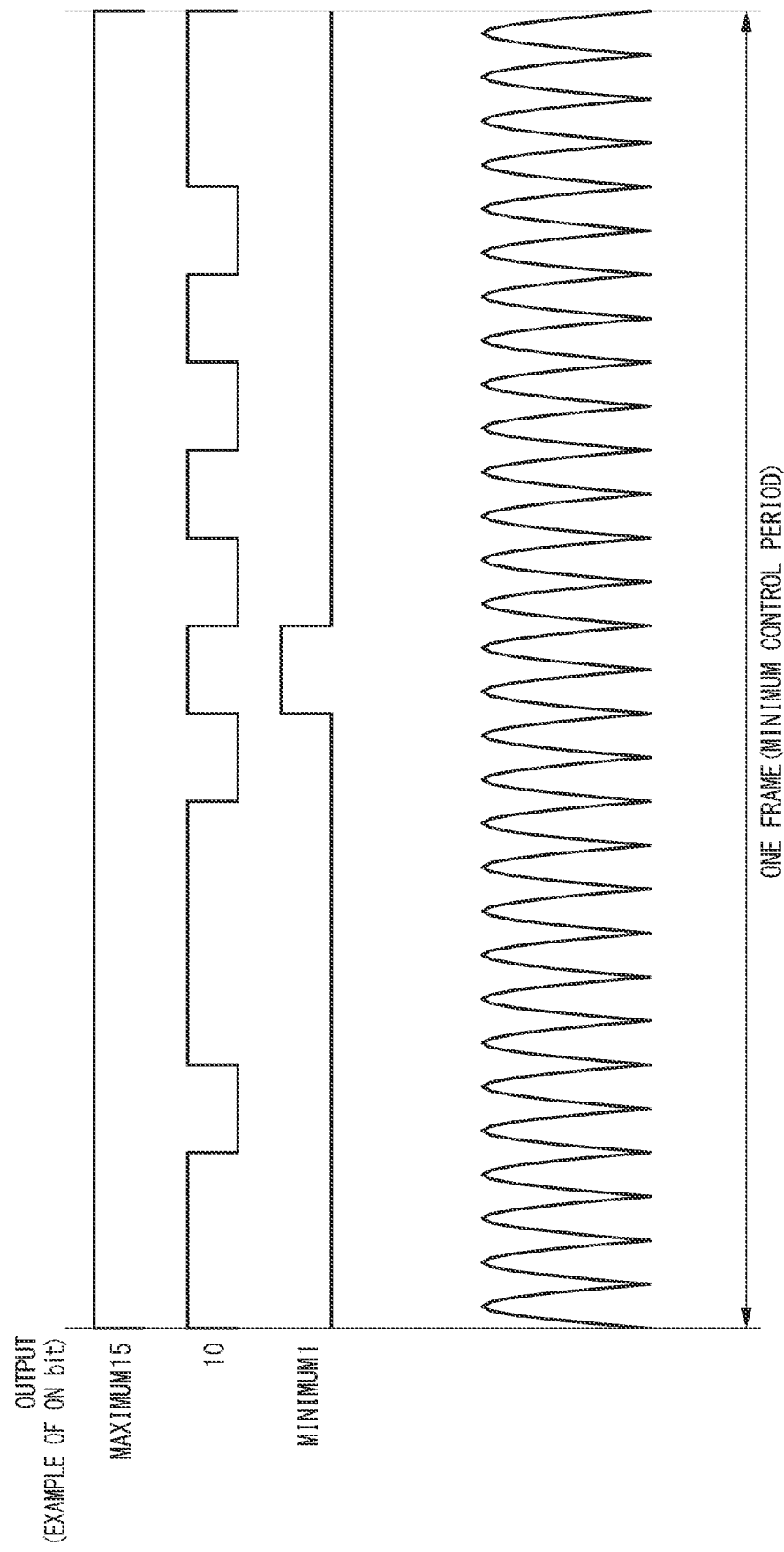
FIG. 8 is a diagram for describing PNM control to be executed by the controller included in the converter.

FIG. 8 is a diagram for describing PNM control to be executed by the controller 304. FIG. 8 shows an example of output in 15 stages by 4 bits, and as described above, two control pulses are the minimum resolution. The controller 304 generates a pulse sequence in 15 stages depending on the required output voltage, and switches on/off of the field effect transistor FET by outputting the pulse sequence to the field effect transistor FET.

Figure 9:
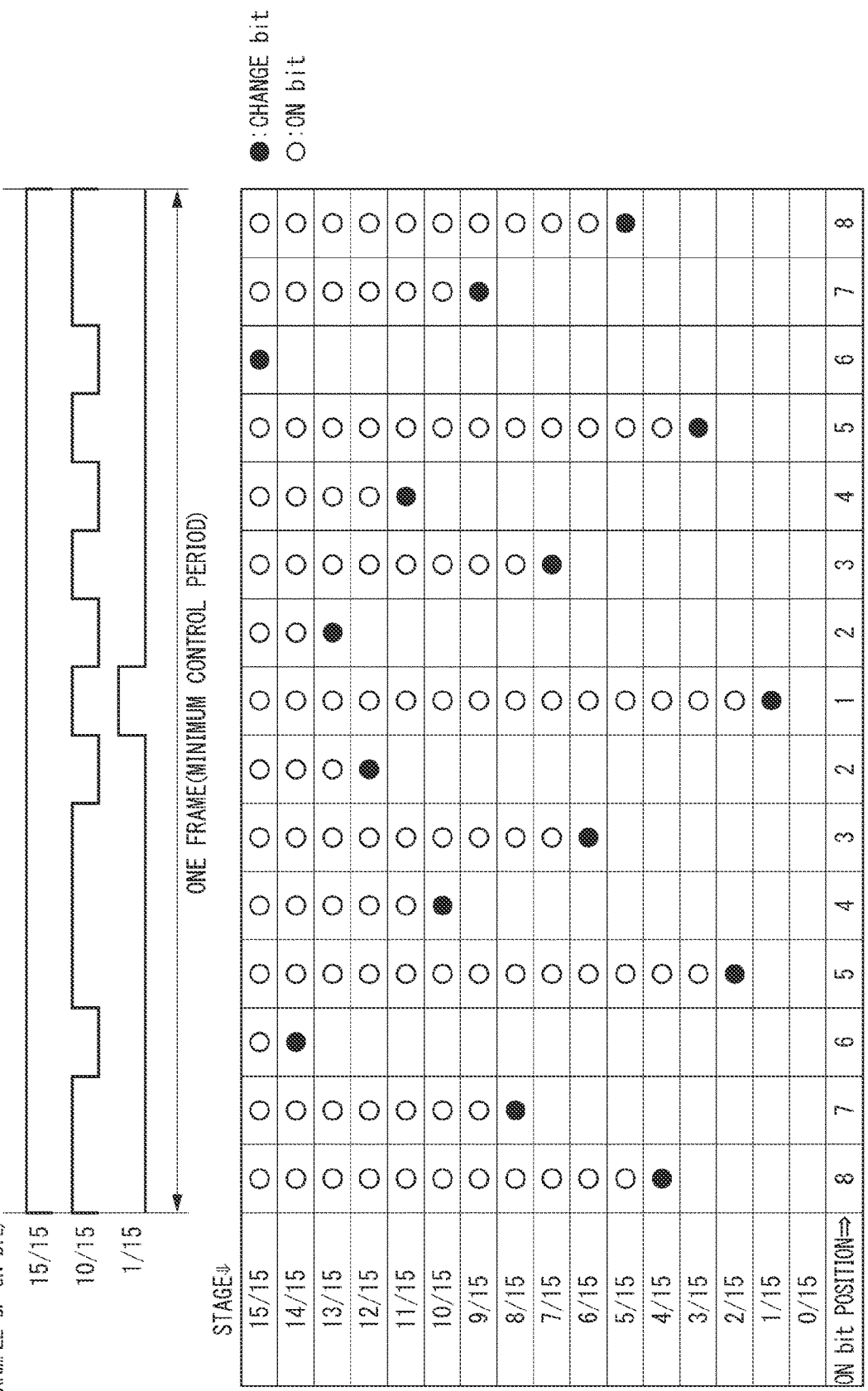
FIG. 9 is another diagram for describing PNM control to be executed by the controller included in the converter.

FIG. 9 is another diagram for describing PNM control to be executed by the controller 304. In FIG. 9, the black circle indicates the bit position to be set on next. As illustrated in FIG. 9, this embodiment illustrates an example of averaging pulses in a pulse sequence, but for example, may give a weight by preferentially setting a specific position of the pulse sequence to execute more specific control. Therefore, when the LCC resonance frequency (for example, fr) is sufficiently high compared with a desired output frequency (for example, f0) as illustrated in FIG. 4(d), a control resolution, which is half the ratio, is obtained.

Figure 10:
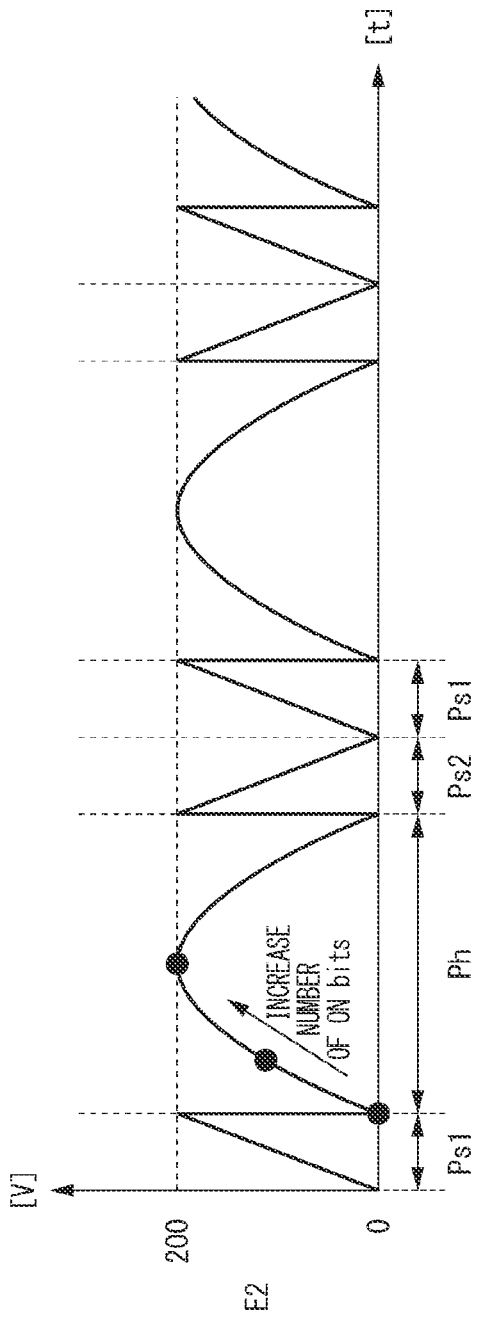
FIG. 10 is a diagram illustrating an example of a relationship between a voltage waveform generated by the converter and a pulse sequence output by the PNM control.

FIG. 10 is a diagram illustrating an example of a relationship between a voltage waveform generated by the converter and a pulse sequence output by the PNM control. As illustrated in FIG. 10, the converter 300 outputs 0 V at a time point P1, but 200 V has been output immediately before, and thus a difference $\Delta V$ between a measured voltage V (200 V) and a target voltage V*(0 V) is a large negative value. At this time, for example, the feedback unit 3044 calculates $K \times \Delta V = \Delta n$ by proportional control with K serving as a proportional gain, and $\Delta n$ becomes a large negative value. Thus, the feedback unit 3044 instructs the comparison unit 3046 to set n=0, that is, to set all the bits of the pulse sequence off.

Next, at a time point P2, the converter 300 outputs 100 V, but 0 V has been output immediately before, and thus the difference $\Delta V$ between the measured voltage V (0 V) and the target voltage V*(100 V) becomes a positive value. At this time, the feedback unit 3044 calculates $K \times \Delta V = \Delta n$ again, and $\Delta n$ becomes a positive value. Thus, for example, the feedback unit 3044 instructs the comparison unit 3046 to set n=7, that is, to set 7 bits of the pulse sequence on.

Next, at a time point P3, the converter 300 outputs 200 V, but 100 V has been output immediately before, and thus the difference $\Delta V$ between the measured voltage V (100 V) and the target voltage V*(200 V) becomes a positive value. At this time, the feedback unit 3044 calculates $K \times \Delta V = \Delta n$ again, and $\Delta n$ becomes a positive value. Thus, for example, the feedback unit 3044 instructs the comparison unit 3046 to set n=15, that is, to set 15 bits of the pulse sequence on. In this manner, in addition to a sine waveform, the controller 304 can achieve a desired output waveform by outputting a pulse sequence that depends on the required output voltage to control switching of the field effect transistor FET. The controller 304 may perform certain degree of predictive control to adjust a delay due to the above-mentioned feedback control.

[Flow of Processing]

Figure 11:
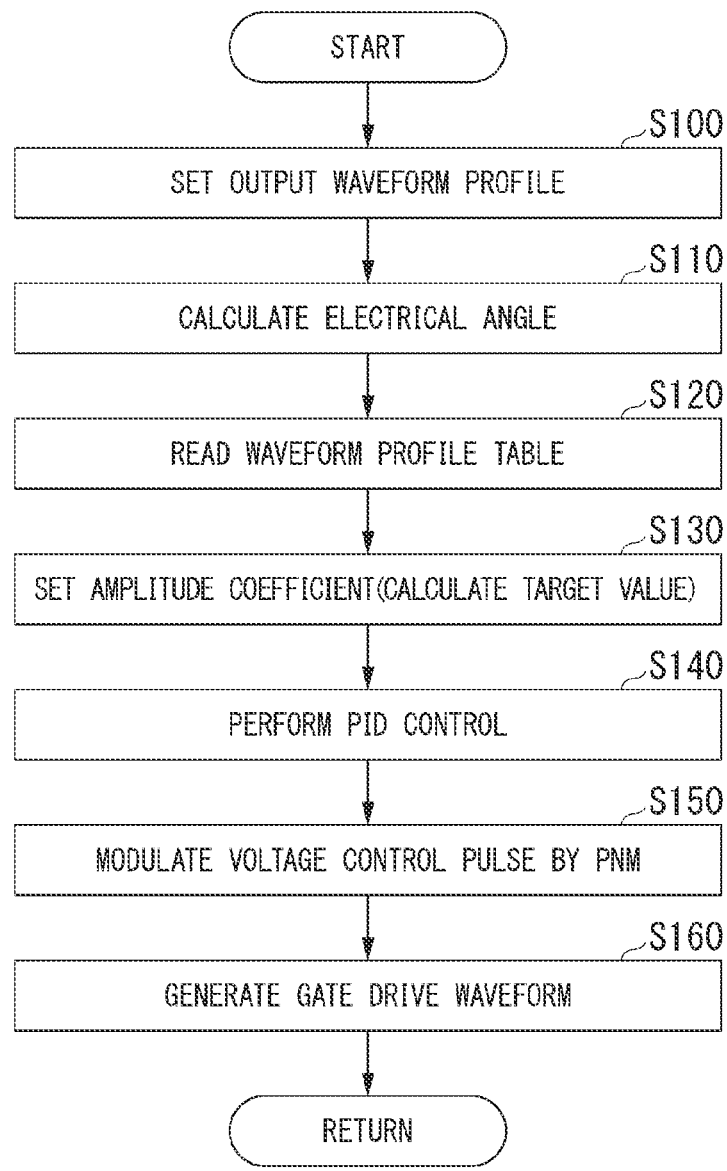
FIG. 11 is a flow chart illustrating an example of a flow of processing to be executed through cooperation between the control device and the controller.

FIG. 11 is a flow chart illustrating an example of a flow of processing to be executed through cooperation between the control device 100 and the controller 304. The processing of this flowchart is executed repeatedly during traveling of the vehicle 1.

The control device 100 first sets the output waveform profile to be output to the controller 304, and notifies the controller 304 of the output waveform profile (Step S100). The controller 304 calculates an electrical angle (Step S110). Next, the controller 304 reads a waveform profile table (Step S120). Next, the control device 100 sets an amplitude coefficient command value and notifies the controller 304 of the amplitude coefficient command value, and the controller 304 calculates a target value of the output voltage (Step S130). Next, the controller 304 performs PID control to generate a voltage control pulse (Step S140). Next, the controller 304 modulates a voltage control pulse in a modulation algorithm such as PNM (Step S150). Next, the controller 304 generates a gate drive signal to be input to the gate terminal of the field effect transistor FET (Step S160). Then, the processing of this flowchart is finished.

According to the embodiment described above, the converter 300 controls the switching element so as to output a voltage that depends on the output waveform profile of a desired waveform. Further, at the time of a regenerative operation of the traveling motor 10, the field effect transistor FET to be electrically connected to the transformer is switched and the step-up ratio from the secondary side full bridge circuit to the primary side full bridge circuit is increased, to thereby be able to store power generated by the regenerative operation into the battery 20. As a result, it is possible to increase the control range of the output voltage while avoiding complexity of the circuit.

This concludes the description of the embodiment for carrying out the present invention. The present invention is not limited to the embodiment in any manner, and various kinds of modifications and replacements can be made within a range that does not depart from the gist of the present invention. For example, the present invention can be applied to power conversion equipment and grids, which can be connected to commercial power systems.

What is claimed is:

1. A converter comprising:
   a primary-side switching unit to be connected to a battery;
   a secondary-side switching unit to be connected to a motor;
   a transformer provided between the primary-side switching unit and the secondary-side switching unit; and
   a controller configured to control at least the secondary-side switching unit so as to output a voltage that depends on an output waveform profile constituting a part of a sine wave to the motor,
   wherein
   the converter is an LLC resonant converter, and
   the controller causes the secondary-side switching unit to generate the voltage that depends on the output waveform profile by pulse number modulation control for generating a pulse sequence selectively from a plurality of consecutive periods.

2. The converter according to claim 1, further comprising a switching mechanism configured to switch a turn ratio of the transformer.

3. The converter according to claim 2, wherein in response to the motor executing a regenerative operation, the controller controls the switching mechanism to switch the turn ratio of the transformer.

4. The converter according to claim 3, wherein in response to the motor executing the regenerative operation, the controller controls the switching mechanism to increase a step-up ratio from the secondary-side switching unit to the primary-side switching unit.

5. A control device for a converter, the converter comprising:
   a primary-side switching unit configured to connect to a battery;
   a secondary-side switching unit configured to connect to a motor; and
   a transformer provided between the primary-side switching unit and the secondary-side switching unit;
   wherein
   the control device is configured to control at least the secondary-side switching unit so as to output a voltage that depends on an output waveform profile constituting a part of a sine wave to the motor,
   the converter is an LLC resonant converter, and
   the control device causes the secondary-side switching unit to generate the voltage that depends on the output waveform profile by pulse number modulation control for generating a pulse sequence selectively from a plurality of specific consecutive periods.

6. A control method for a converter, the converter comprising:
   a primary-side switching unit to be connected to a battery;
   a secondary-side switching unit to be connected to a motor;
   a transformer provided between the primary-side switching unit and the secondary-side switching unit; and
   a switching mechanism configured to switch a turn ratio of the transformer,
   wherein
   the converter is an LLC resonant converter, and
   the control method comprises:
   controlling at least the secondary-side switching unit so as to output a voltage that depends on an output waveform profile constituting a part of a sine wave to the motor; and
   causing the secondary-side switching unit to generate the voltage that depends on the output waveform profile by pulse number modulation control for generating a pulse sequence selectively from a plurality of consecutive periods.

* * * * *